United States Patent

Morita et al.

[11] Patent Number: 5,500,189
[45] Date of Patent: Mar. 19, 1996

[54] APPARATUS FOR CRYSTALLIZATION OF ORGANIC MATTER

[75] Inventors: Minoru Morita; Keizo Takegami, both of Tokyo, Japan

[73] Assignee: Tsukishima Kikai Co., Ltd., Tokyo, Japan

[21] Appl. No.: 383,641

[22] Filed: Feb. 6, 1995

Related U.S. Application Data

[62] Division of Ser. No. 876,630, Apr. 30, 1992, Pat. No. 5,409,505.

[30] Foreign Application Priority Data

Apr. 30, 1991 [JP] Japan ................... 3-097809

[51] Int. Cl.$^6$ .................................................. C30B 35/00
[52] U.S. Cl. ..................... 422/251; 23/295 R; 117/200; 422/245.1
[58] Field of Search ............... 23/293 R, 295 R; 62/534; 117/200; 165/104.21; 422/245, 251; 585/812

[56] References Cited

U.S. PATENT DOCUMENTS

| | | | |
|---|---|---|---|
| 1,976,204 | 10/1934 | Woorhees et al. | 62/534 |
| 3,316,728 | 5/1967 | Biermann | 62/476 |
| 3,334,492 | 7/1967 | Bligh | 62/476 |
| 3,486,848 | 12/1969 | Hendrix | 23/295 R |
| 3,501,493 | 3/1970 | Oldenburg | 62/534 |
| 4,199,961 | 4/1980 | Carter et al. | 62/535 |
| 4,199,962 | 4/1980 | Carter et al. | 62/585 |
| 4,452,621 | 6/1984 | Fowles et al. | 62/534 |
| 4,776,930 | 10/1988 | Bianchi et al. | 204/87 |
| 4,840,652 | 6/1989 | Simon et al. | 62/534 |
| 5,027,616 | 7/1991 | Tongu | 62/476 |
| 5,127,921 | 7/1992 | Griffiths | 23/295 R |
| 5,409,505 | 4/1995 | Morita et al. | 23/295 R |

FOREIGN PATENT DOCUMENTS

| | | |
|---|---|---|
| 1517438 | 5/1961 | Germany . |
| 1619775 | 8/1967 | Germany . |
| 2528611 | 6/1975 | Germany . |

*Primary Examiner*—R. Bruce Breneman
*Assistant Examiner*—Felisa Garrett
*Attorney, Agent, or Firm*—Lowe, Price, LeBlanc & Becker

[57] ABSTRACT

Adiabatic self-evaporation cooling of a refrigerant is performed in a crystallizer for a treated organic matter which contains the refrigerant and is fed into the crystallizer. Crystals produced by the adiabatic self-evaporation cooling are withdrawn from the crystallize. An evaporated vapor is introduced from the crystallizer into an absorber so as to be contacted with a concentrated solution transformed from a generator for condensation in the absorber. A condensate is introduced from the absorber into the generator, the refrigerant is evaporated in the generator, an evaporated vapor is introduced from the generator to the condenser, the evaporated vapor is condensed in the condenser, a condensate is supplied from the condenser to the crystallizer and the concentrated solution is circulated between the absorber and the generator by returning the concentrated solution, in which the concentration of an absorbent is increased by the generator to the absorber.

1 Claim, 4 Drawing Sheets

5,500,189

APPARATUS FOR CRYSTALLIZATION OF ORGANIC MATTER

This application is a division of application Ser. No. 07/876,630 filed Apr. 30, 1992, now U.S. Pat. No. 5,409,505.

TECHNICAL FIELD

This invention relates to an apparatus for crystallization of an organic matter.

BACKGROUND ART

Generally, as methods for crystallization of an organic matter, there are (1) Melting-type Purification, (2) Crystallization Using Solvent (being soluble each other), (3) Cooling Crystallization with Solution being Insoluble in Organic Matter (such as water).

On the other hand, cooling methods for industrial crystallization can be classified as follows.

(A) Indirect Cooling: A molten organic matter is fed into a thin, cylindrical vessel. A cooling jacket is provided on the outside of the vessel and cooling water is passed through the cooling jacket. Thus, crystals are formed and attached to the inner surface of the above vessel. These crystals are scraped and deposited with means such as a scraping blade so as to be withdrawn in the form of slurry and separated outside of this system.

(B) Direct Cooling: A molten organic matter is fed into a vessel having an agitator. At the same time, a solvent being insoluble in the organic matter, such as water, is fed to the vessel. Thus, cooling is carried out for crystallization, while the organic matter is dispersed in the water.

(C) Adiabatic Cooling: An organic matter is dissolved in a solvent and operated under the condition of self-evaporation performed in a crystallizer. Thus, a produced vapor is compressed by a compressor and condensed by a condenser. In this process, a condensed refrigerant is recycled to the crystallizer.

The above method (1) Melting-Type Purification has a fundamental defect that the organic matter is deteriorated because of high temperature at which the treated organic matter is melted.

Further, the method (A) Indirect Cooling, due to the low heat transfer coefficient of the order of 200–500 Kcal/m$^{2.}$°C. hr, requires a large sized apparatus and a high construction cost.

In the method (B) Direct Cooling classified in the above system (3), small quantity of the organic matter is often dissolved in the water. Thus, its treatment requires a high cost.

On the other hand, in the method (2), that is adiabatic self-evaporation cooling using the solvent, a crystallizer should be operated at a condensing temperature which is too low for normal cooling water to condense. Accordingly, large sized refrigerating equipment is required resulting in a high construction cost. Further, when the method (C) Adiabatic Cooling is adapted, in general, a compressor should be used in order to rise a compressing temperature under a high pressure. Accordingly, a high operation cost is required for the compressor. In some cases, depending on an evaporating temperature and a temperature of cooling water, the compressor is not required. However, since the condensing temperature of the refrigerant is usually under 0° C., even if the compressor is not used, brine must be produced by a refrigerator for condensation, which causes a heavy investment for a construction cost related to refrigerating equipment.

DISCLOSURE OF THE INVENTION

It is therefore, a main object of the present invention to attain a low operation and construction cost and to improve the purity of the crystals.

As explained below, according to the present invention, the advantages are provided that utility equipment such as refrigerating equipment is unnecessary and that the reduced operation cost can be attained.

BRIEF DESCRIPTION OF THE DRAWINGS

Now, the present invention will be explained more closely by examples with reference to the drawings.

BEST MODE FOR CARRYING OUT THE INVENTION

In order to solve the above objects, the method of the present invention provides a crystallizer, an absorber, a generator and a condenser, performing adiabatic self-evaporation cooling of a refrigerant in the crystallizer for the treated organic matter which contains the refrigerant and is fed into the crystallizer, withdrawing crystals produced by the adiabatic self-evaporation cooling from the crystallizer, introducing an evaporated vapor from the crystallizer into the absorber so as to be contacted with a concentrated solution transformed from the generator for condensation in the absorber, introducing a condensate from the absorber into the generator, evaporating the refrigerant in the generator, introducing an evaporated vapor from said generator into the condenser, condensing the evaporated vapor in the condenser, supplying a condensate from the condenser to the crystallizer and circulating the concentrated solution between the absorber and the generator by returning the concentrated solution, in which the concentration of an absorbent is increased by the generator, to the absorber.

In this case, a mother liquor of the crystallizer can be fed to the condenser.

The method of the present invention can be applied to the case where the refrigerant is a solvent for the organic matter and the solvent is the absorbent.

On the other hand, the present invention provides an apparatus which comprises a crystallizer for performing adiabatic self-evaporation cooling of a refrigerant for the treated organic matter containing the refrigerant, means for withdrawing crystals produced by the self-evaporation cooling from the crystallizer, and absorber condensing an evaporate vapor received from the crystallizer with a concentrated solution in which the concentration of an absorbent is increased, a generator evaporating the refrigerant, a condenser condensing a vapor evaporated in the generator, means for supplying a condensate from the condenser to the crystallizer and means for circulating the concentrated solution between the absorber and the generator by returning the concentrated solution, in which the concentration of the absorbent is increased by the generator, to the absorber.

In the present invention, since the solvent is added, the temperature for crystallization can be lowered, thereby, quality of the crystals can be improved. Further, crystallization can be carried out by the self-evaporating adiabatic cooling of the refrigerant in the crystallizer. Accordingly, it is unnecessary to obtain cooling heat required for the crystallization from the outside, thus, refrigerating equipment is unnecessary. As a result, operation and construction cost can be lowered.

Figure 1:
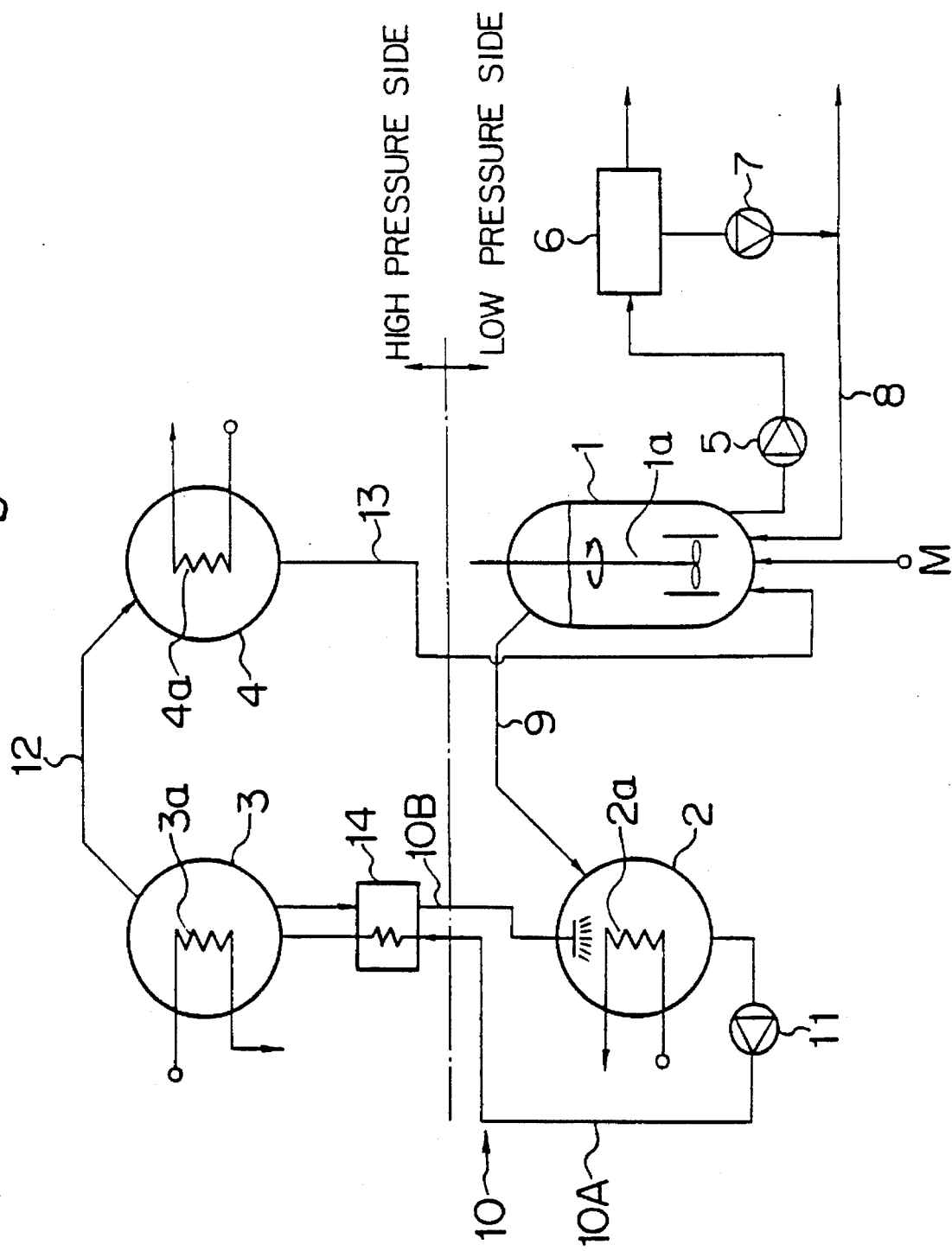
FIG. 1 is a flow sheet showing a first example of the present invention.

FIG. 1 shows a first example of the present invention. Reference numeral 1 designates a crystallizer, reference numeral 2 designates an absorber, reference numeral 3 designates a generator and reference numeral 4 designates a condenser. Crystal-slurry formed in the crystallizer 1 is introduced to a solid-liquid separator 6, a centrifuge or a horizontal filter and the like by a crystal withdrawing pump 5. Almost all filtrate from the crystal-slurry is recycled to the crystallizer 1 through a returning passage 8 by a returning pump 7. Crystals are taken as final products directly or through succeeding other crystallizing means. On the other hand, the crystallizer 1 and the absorber 2 are operated under a low pressure while the generator 3 and the condenser 4 are operated under a high pressure.

In case that a treated organic matter M serves as an absorbent, the organic matter M is fed from the outside into the crystallizer 1 having an agitator 1a under the presence of the refrigerant of the order of 1–5%. The crystallizer 1 is operated in a vacuum or under a certain pressure. The treated organic matter is mixed by means of the agitator 1a with the condensed refrigerant transformed from the condenser 4. Reducing of the pressure of the refrigerant occurred by this mixing causes evaporation of the refrigerant. Thereby, crystallization heat is removed so that the crystals are deposited. The slurry containing the deposited crystals becomes final products by means of the above operations.

A vapor produced in the crystallizer 1 is fed into the absorber 2 through a vapor pipe-line 9. The vapor is contacted with a concentrated absorbent solution returned through a returning passage 10B of a circulating passage 10 for the concentrated absorbent solution. For this reason, boiling point rise is occurred and a condensing temperature is risen. On the other hand, the absorbent solution contacts with the vapor transformed from the crystallizer 1 and condenses the vapor through a cooler 2a so as to absorb the vapor.

A condensate in the absorber 2 is fed to the generator 3 through a transporting passage 10A by means of a concentrated solution circulating pump 11. In the generator 3, the refrigerant contained in the concentrated solution is evaporated by steam or other heat source with a heater 3a equipped in the generator 3. The evaporated refrigerant is introduced to the condenser 4 through a refrigerant transporting passage 12. In the condenser 4, the evaporated refrigerant is cooled with a cooler 4a equipped in the condenser 4 so as to be condensed. A condensate is introduced to the crystallizer 1 through a returning passage 13 so as to be applied in the adiabatic self-evaporating cooling of the refrigerant.

The absorbent solution, from which the refrigerant is removed in the generator 3 so as to increase own concentration, is passed through a heat exchanger 14 for heating the concentrated absorbent solution transforming to the generator 3 and is returned to the absorber 2 through the returning passage 10B.

Figure 2:
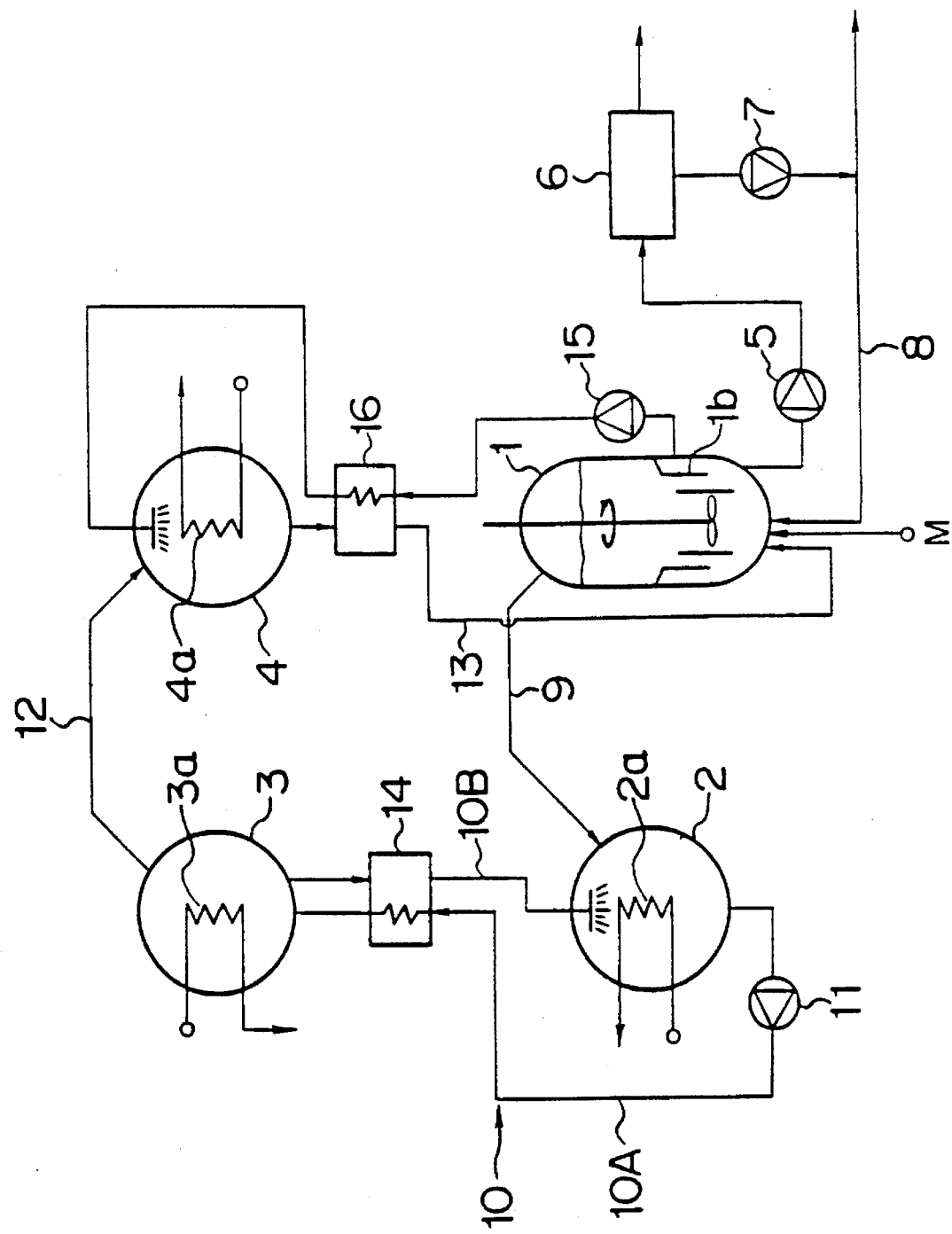
FIG. 2 is a flow sheet showing a second example of the present invention.

FIG. 2 shows a second embodiment which can be referred to mother liquor circulation. A mother liquor separated from crystal-slurry with a separating plate 1b is withdrawn from a crystallizer 1 with a mother liquor circulating pump 15. Then, the mother liquor is fed to a condenser 4 through a heat exchanger 16 and mixed with a vapor fed from a generator 3 so that the concentration of a solute (organic matter) is increased for boiling point rise. Precisely, the condensing temperature can be risen under the constant pressure, while the pressure can be reduced under the constant condensing temperature. Therefore, comparing with the case that a pure refrigerant is only condensed, the higher temperature of the cooling water can be approved for the condensation and higher condensing pressure is not required, that is, under a comparatively lower pressure the condensation can be performed. As the mother liquor, a filtrate of a solid-liquid separator 6 can be applied.

In the present invention, there are various modifications of operation depending on kinds of combination of the refrigerant, absorbent and the organic matter. Now, these modifications will be explained.

Case (1) The absorbent and the refrigerant are not in vapor-liquid equilibrium and the absorbent are circulating only between the generator and the absorber.

This case is that the refrigerant and the product (organic matter) are soluble each other and they are not in vapor-liquid equilibrium or the organic matter is not the absorbent. For example, the water-lithium bromide system is used as the refrigerant-absorbent, then the absorbent is circulated between the generator and the absorber. In this embodiment, as long as water is used as the refrigerant, it is difficult that the temperature drops under $-10°$ C. in the crystallizer. However, if Freon (trademark) R22($CHCl_2F$)–E181($CH_3O(CH_2CH_2O)_3$) are used as the refrigerant-absorbent, it is possible that the temperature drops into the order of $-10°$ C. to $-60°$ C. in the crystallizer. Further, if the above mother liquor circulation is applied, the higher condensing temperature is approved in the condenser. As the examples of refrigerant-organic matter system in this embodiment, there are the water-nitrobenzene system where the absorbent is lithium bromide and the styrene-R22 system where the absorbent is E181 and the like.

Case (2) The refrigerant is the solvent of the organic matter and the organic matter (product) is the absorbent.

This case is that the organic matter does not exist in eutectic equilibrium and does not contain other substances causing the boiling point rise. Precisely, this case is that the almost pure organic matter has a certain solubility in the refrigerant and exists in vapor-liquid equilibrium. For example, there are methanol-methyl methacrylate (MAA), acrylic acid (AA)-acetic acid, Freon R22-hexamethylenediamine (HMDA), Freon R22-adipic acid.

The generator and the condenser are operated under higher pressure comparing with the crystallizer and the absorber so that the condensing temperature is risen, that is, the difference of the condensing temperature is produced. This is more efficient reason of heat transfer than the reason of the use of absorption heat. Particularly, for the substances which are in equilibrium almost according to Raoult's law, the vapor-liquid equilibrium is linear so that large mixing heat can not be generated.

Case (3) The refrigerant and the solvent are in vapor-liquid equilibrium and the solvent is the absorbent.

An example of this case is the relation of the adduct of bisphenol A (BPA), phenol and water. The bisphenol A and the phenol are in equilibrium. When these substances are cooled, the adduct of the bisphenol A and the phenol is deposited. Only the phenol can be used as the refrigerant as well as the solvent. However, in order to obtain more purified crystals, the water is preferably used as the refrigerant. When the water is added so as to perform the adiabatic cooling, the water and the phenol can be obtained in the form of vapor. According to the present invention, the adiabatic cooling can be carried out surely without a booster, a tiller refrigerator and a compressor. Further, even for evaporating the phenol having low pressure of the order of 0.1 to 2.0 mmHg, a vacuum device is not required.

In the present invention, there are the following embodiments depending on the purity of the molten feed-material and the amount of withdrawn crystals.

Embodiment (1) A mother liquor fed to a crystallizer has a high purity.

When the purity of the mother liquor fed to the crystallizer is higher than 95.0%, particularly is the order of 99.9%, the amount of the mother liquor withdrawn from the crystallizer is very small. Stripping operation, however, is necessary to recover the mother liquor. The stripped refrigerant is absorbed by the supplied feed, but the resultant concentration of the refrigerant can not reach a desired value for the crystallizer. This problem is solved by the following embodiment.

Figure 3:
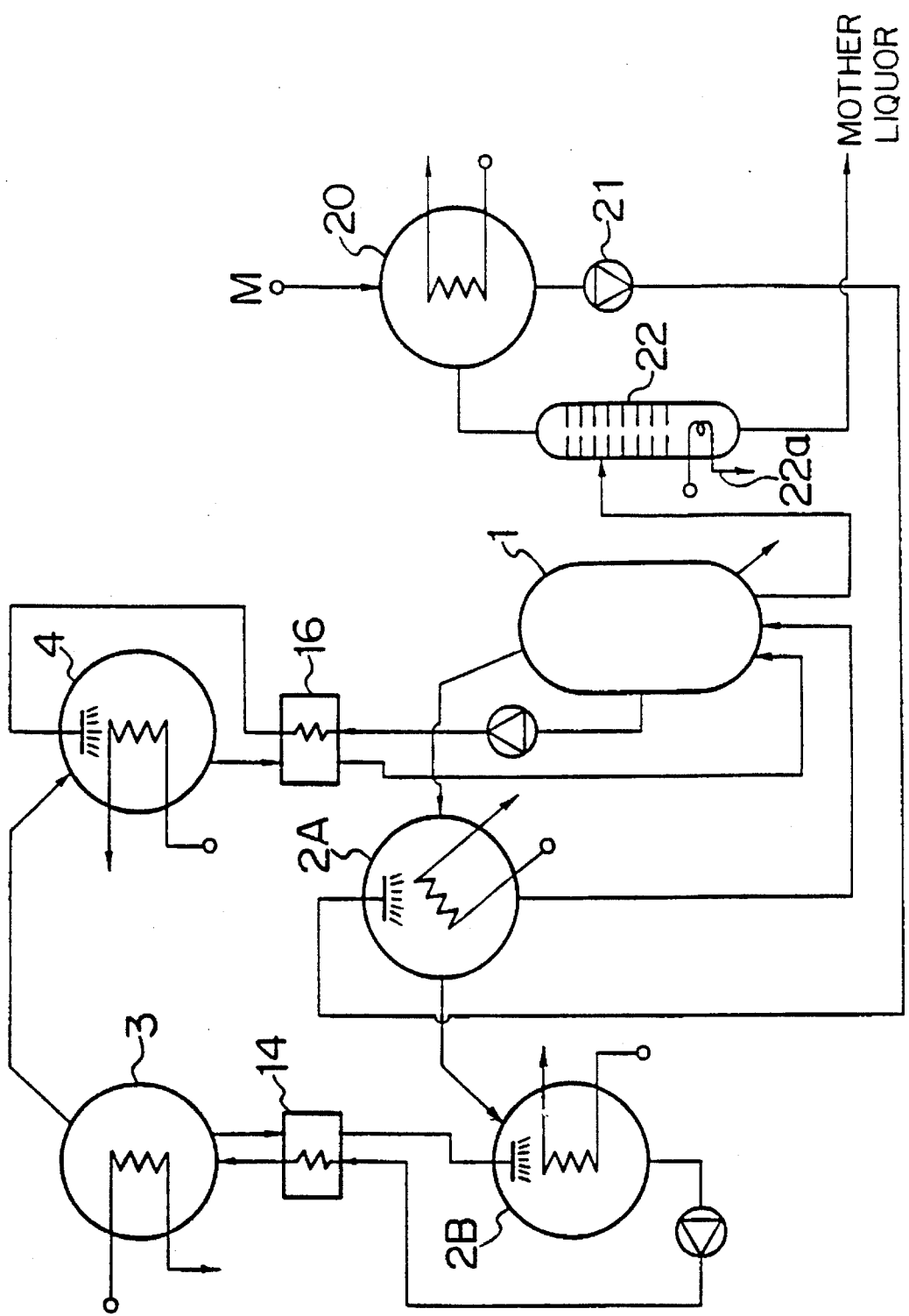
FIG. 3 is a flow sheet showing a modification of the present invention.

This embodiment is explained referring to FIG. 3. With respect to the direction of a vapor from a crystallizer 1, the first absorber 2A and the second absorber 2B are arranged in series. A material M is fed to the first absorber 2A through a condenser 20 by means of a feed pump 21. In the first absorber 2A, a refrigerant is absorbed into the material so that the absorbing capacity of the material is left when the absorption is finished, then the material is fed to the crystallizer 1. Thus, much load is not put on the absorber 2B. Accordingly, also on the generator 3 and the condenser 4, much load is not put, which results in the advantage of a reduced construction cost and small maintenance fee. The refrigerant is absorbed into the mother liquor at the same temperature as that at which the second absorber 2B is operated. The mother liquor withdrawn partly from the crystallizer 1 is fed to a stripper 22. In the stripper 22, the mother liquor is heated with a heater 22a so that the refrigerant is separated. The mother liquor is fed out from the system and the refrigerant is introduced to the first absorber 2A together with the material.

Embodiment (2) An absorbent solution contains a large amount of impurities. (Accordingly, a large amount of mother liquor should be withdrawn from a crystallizer.)

Figure 4:
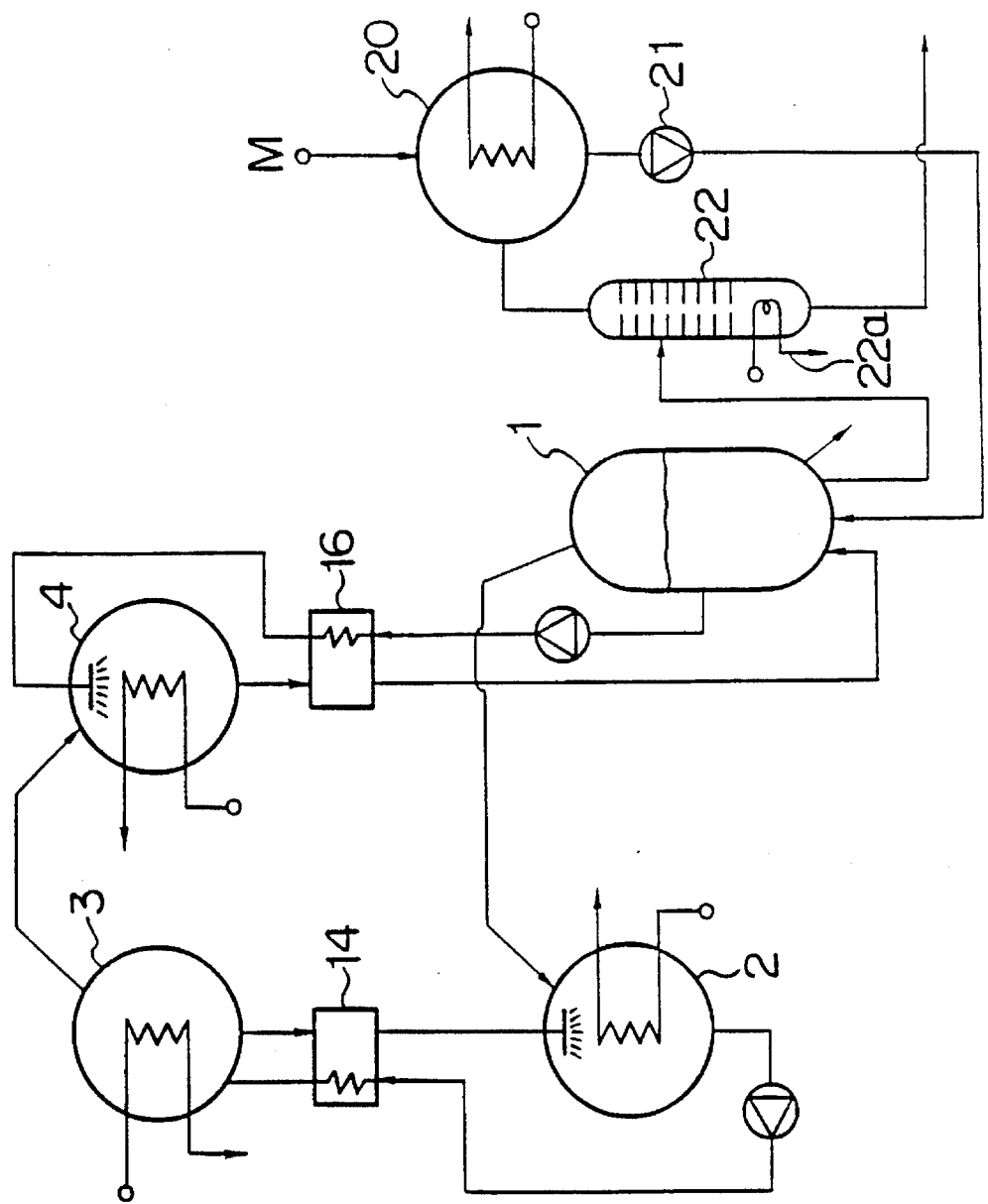
FIG. 4 is a flow sheet showing another modification of the present invention.

In this case, as shown in FIG. 4, since the withdrawn mother liquor contains a large amount of refrigerant, this refrigerant is stripped in the stripper 22 so as to be absorbed into the new material M for feeding to the crystallizer 1.

Now, the effects of the present invention will be made clear by the following examples.

In the following examples, a vertical crystallizer (Diameter of 300 mm×Height of 1.5 m, the holdup volume of slurry is 30 liter) is used as a crystallizer. As the absorber, the generator, the condenser and the heat exchanger, apparatuses of horizontal multipipe type are used (the values of heat transfer area are 0.3 m$^2$, 0.3 m$^2$, 0.3 m$^2$ and 0.2 m$^2$ respectively.).

EXAMPLE 1

In this example the absorbent is LiBr, the refrigerant is water, and the absorbent is circulated only between the absorber and the generator.

In the above pilot plant of crystallization, nitrobenzene solution having the material concentration of 91 to 92% is fed to the crystallizer at the rate of 13 kg/h. The crystallizer is operated at the temperature of 5.0° to 5.5° C., under the pressure of 6.0 to 7.0 torr. The water concentration is 0.15 to 0.2% and the purity of the produced crystals is 0.97 to 1.0 kg/h.

A water vapor produced in the crystallizer is transformed to the absorber. In the absorber, after receiving a solution of LiBr having the concentration of 62.0% and the temperature of 39° to 40° C. and transformed from the generator operated under the pressure of 6 to 7 torr, the water vapor is absorbed so that the solution of LiBr having the concentration of 58.0% is produced. This solution is transformed to the generator. In the generator, the solution is heated by steam having the temperature of 140° C. Then, the generated vapor is fed to the condenser. The condenser is operated under the pressure of 60 torr and at a condensing temperature of 41° C. A resultant condensate contains LiBr having the concentration of 2 to 3 ppm. Finally, this condensate is fed to the crystallizer at the rate of 1.0 to 1.1 kg/h.

The amount of the steam used in the above operation is 1.0 to 1.1 kg/h. It is clearly understood that by means of circulation of the water vaporized by the crystallization, the heat required for the crystallization can be removed without a compression refrigerator or an absorption refrigerator.

If a compressor driven by steam (steam booster) was used, 1.7 to 1.9 kg/h of medium pressure steam having the pressure of 10 to 15 kg/cm$^2$ (absolute pressure) would be required as driving steam under the operating pressure of 15 torr. It is clearly understood that the amount of the driving steam would be increased by 3 to 4 times that of the vapor.

EXAMPLE 2

In this example the refrigerant is the solvent of the organic matter and the organic matter is the absorbent.

Using the pilot plant shown in FIG. 2, the method of the present invention is applied to lactam-water system. The fed solution is supplied at a rate of 12.8 kg/h. The generated vapor is transformed to the absorber. The crystallizer is operated at the temperature of 52° C. under the pressure of 15 torr. The concentrated lactam having the concentration of 1% is fed to the absorber from the generator at the rate of 4.5 kg/h so that the condensate having the concentration of 5% is obtained. Then, this solution is supplied to the generator. The generator is operated under the pressure of 30 torr at the evaporating temperature of 110° C. The concentrated solution is returned to the absorber and the vapor generated in the generator is transformed to the condenser. To the condenser, the solution of the crystallizer is fed at the rate of 12 to 13 kg/hr so that the condensate having the water of 18 to 19% can be obtained at the condensing temperature of 48° C. This condensate is transformed to the crystallizer so that adiabatic cooling is performed in the crystallizer. Comparing with this, if the mother liquor is not circulated but just water is used, the condensing temperature is 29° C. resulting in necessity of a refrigerator for stable operation. The amount of the consumed steam in the generator is 2.7 to 2.8 kg/h. Precisely, the mother liquor circulation shows a significant effect.

In crystallization of this kind to evaporate ammonia, for example, when the ammonia vapor is condensed at the rate of 1000 kg/h and at the temperature of 40° C. under the applied pressure of 0.8 kgf/cm$^2$G, the pressure should be increased to 10 kgf/cm$^2$G. Required power of a compressor for this increasing is 190 to 200 kw. Comparing with this, in the embodiment of the present invention where the ammonia is absorbed into the water, the steam having the pressure of 5 kgf/cm²G is consumed at the rate of 1.25 to 1.35 kg/h enough, which indicates clearly that the operation cost is decreased extremely.

EXAMPLE 3

In this example the refrigerant and the solvent are in vapor-liquid equilibrium and the solvent is the absorbent.

Bisphenol A forms an adduct with phenol and this adduct is deposited under the determined condition. It is known that the quality can be improved by adding water. Using the above pilot plant, a material solution containing DDP having the concentration of 40 to 41 wt % and phenol having the concentration of 49 to 50 wt % is fed continuously to an adiabatic vacuum crystallizer at the rate of 30 to 31 kg/hr at the temperature of 110° to 115° C. Thus, crystals of the phenol adduct is obtained at the rate of 10 kg/h. In this case, the operation condition is that the operation pressure of the crystallizer is 35 to 38 torr, the temperature is 48° C. and the water content is 4.0 wt %. The generated vapor is transformed to the absorber and mixed with the concentrated solution having the phenol concentration of 99 wt % fed from the generator at the rate of 45.4 kg/h. Thus, a phenol solution having the concentration of 99.0 wt % and the condensing temperature of 45° C. can be obtained. Then, this solution is fed to the generator through the heat exchanger. In the generator, a phenol water vapor is produced by heating of 3.6 kg/h of the steam having the temperature of 130° C. under the operation pressure of 80 torr and at the evaporating temperature of 80° to 82° C. This vapor is transformed to the condenser. The amount of this vapor is 2.9 kg/h and its condensing temperature is 45° C. In this operation, the mother liquor of the crystallizer is not recycled to the condenser. However, in the case that the mother liquor is circulated to the condenser and the condensate having the concentration of 20% can be obtained, the condensing temperature is 50° C.

As explained above, when the crystallizer for the bisphenol A is operated technically, operation with a tiller is required, but according to the method of present invention, the amount 2.9 kg/h of the steam is enough, which shows clearly that economical apparatus can be provided.

As a result, by recycling the vapor produced in the crystallizer without a compression refrigerator and an absorption refrigerator, the required heat for crystallization can be removed.

We claim:

1. An apparatus for crystallization of an organic matter comprising:

a crystallizer for performing adiabatic self-evaporation cooling of a refrigerant-solvent containing an organic matter;

means for withdrawing crystals from said crystallizer which crystals are produced by adiabatic self-evaporation cooling;

an absorber in fluid communication with said crystallizer for receiving and condensing an evaporated vapor of the refrigerant-solvent received from said crystallizer, said absorber also receiving a concentrated liquid absorbent solution and contacting the evaporated vapor with the concentrated liquid absorbent solution in order to condense the evaporated vapor and increase the concentration of absorbent in the liquid absorbent solution;

a generator in fluid communication with said absorber for receiving a mixture of condensed evaporated vapor and concentrated liquid absorbent solution and evaporating refrigerant-solvent therefrom and recovering the concentrated liquid absorbent solution which is transferred to said absorber;

a condenser in fluid communication with said generator for receiving and condensing the evaporated refrigerant-solvent vapor evaporated in said generator;

means for supplying the condensed refrigerant-solvent from said condenser to said crystallizer; and means for circulating the concentrated absorbent solution between said absorber and said generator, which means for circulating returns concentrated absorbent solution, in which the concentration of absorbent is increased by said generator, to said absorber.

* * * * *